(12) United States Patent
Neal et al.

(10) Patent No.: US 9,657,762 B2
(45) Date of Patent: May 23, 2017

(54) THERMALLY ACTIVATED, SHAPE CONFIGURABLE MECHANICAL LOCKING Z-PIN

(71) Applicant: NORTHROP GRUMMAN SYSTEMS CORPORATION, Falls Church, VA (US)

(72) Inventors: Matthew A. Neal, Palmdale, CA (US); Charles R. Smith, Acton, CA (US)

(73) Assignee: Northrop Grumman Systems Corporation, Falls Church, VA (US)

(*) Notice: Subject to any disclaimer, the term of this patent is extended or adjusted under 35 U.S.C. 154(b) by 187 days.

(21) Appl. No.: 14/656,166

(22) Filed: Mar. 12, 2015

(65) Prior Publication Data

US 2016/0265573 A1     Sep. 15, 2016

(51) Int. Cl.
*F16B 19/00* (2006.01)
*B32B 7/08* (2006.01)
(Continued)

(52) U.S. Cl.
CPC ............... *F16B 19/00* (2013.01); *B32B 7/08* (2013.01); *B32B 37/14* (2013.01); *F16B 1/00* (2013.01);
(Continued)

(58) Field of Classification Search
CPC . F16B 1/0014; F16B 2001/0078; F16B 19/00
(Continued)

(56) References Cited

U.S. PATENT DOCUMENTS 2,575,213 A    1/1946   Fruth
3,453,888 A    7/1969   Perry
(Continued)

FOREIGN PATENT DOCUMENTS

JP          10-258471 A    9/1998
WO      WO 2014/038837 A1  3/2014

OTHER PUBLICATIONS

Angioni, S. L. et al. "Impact damage resistance and damage suppression properties of shape memory alloys in hybrid composites—a review" IOP Publishing Smart Materials and Structures, vol. 20, 2011, 24 pgs.

(Continued)

*Primary Examiner* — Flemming Saether
(74) *Attorney, Agent, or Firm* — John A. Miller; Miller IP Group, PLC

(57) ABSTRACT

A Z-pin including a first bi-metal structure having a first metal strip and a second metal strip bonded together, where the first and second metal strips have different coefficients of thermal expansion, and a second bi-metal structure having a third metal strip and fourth metal strip bonded together, where the third metal strip and the fourth metal strip have different coefficients of thermal expansion. The first and third metal strips are selectively secured together at at least one discrete location so that heating of the Z-pin causes the first and second bi-metal structures to deform relative to each other. The Z-pin is inserted into a composite laminate structure while it is in its uncured state, where curing of the composite structure causes the first and second bi-metal structures to deform relative to each other to lock the laminate layers together.

22 Claims, 1 Drawing Sheet

(51) Int. Cl.
  *B32B 37/14*  (2006.01)
  *F16B 1/00*   (2006.01)
  *F16B 5/04*   (2006.01)
  *F16B 19/04*  (2006.01)

(52) U.S. Cl.
  CPC ............... *F16B 5/04* (2013.01); *F16B 19/04* (2013.01); *B32B 2305/72* (2013.01); *F16B 2001/0078* (2013.01)

(58) Field of Classification Search
  USPC ............................................ 411/82.5, DIG. 2
  See application file for complete search history.

(56) References Cited

U.S. PATENT DOCUMENTS

| | | | |
|---|---|---|---|
| 3,848,389 A | 11/1974 | Gapp et al. | |
| 3,913,444 A | 10/1975 | Otte | |
| 3,951,560 A * | 4/1976 | Beer | F16B 1/0014 403/273 |
| 4,485,816 A | 12/1984 | Krumme | |
| 5,120,175 A | 6/1992 | Arbegast et al. | |
| 5,254,837 A | 10/1993 | Grimaldi et al. | |
| 5,536,126 A | 7/1996 | Gross | |
| 5,736,222 A | 4/1998 | Childress | |
| 5,869,165 A | 2/1999 | Rorabaugh et al. | |
| 5,876,540 A | 3/1999 | Pannell | |
| 6,291,049 B1 | 9/2001 | Kunkel et al. | |
| 6,514,593 B1 | 2/2003 | Jones et al. | |
| 6,546,602 B1 * | 4/2003 | Eipper | A44B 18/0003 24/304 |
| 7,785,693 B2 | 8/2010 | Johnson et al. | |
| 8,376,680 B2 | 2/2013 | Haasz et al. | |
| 8,378,220 B2 * | 2/2013 | Ochi | B21D 53/20 174/138 D |
| 8,388,292 B2 | 3/2013 | Kirkwood et al. | |
| 8,763,231 B2 | 7/2014 | Rule et al. | |
| 9,488,208 B2 * | 11/2016 | Hemingway | F16B 1/0014 |
| 2003/0202855 A1 | 10/2003 | Malofsky et al. | |
| 2005/0042023 A1 | 2/2005 | Jones | |
| 2008/0003401 A1 | 1/2008 | Barnes et al. | |
| 2010/0320320 A1 | 12/2010 | Kismarton | |
| 2013/0112664 A1 | 5/2013 | Erlacher et al. | |
| 2014/0250665 A1 * | 9/2014 | Choi | B32B 7/08 29/432 |
| 2015/0165721 A1 * | 6/2015 | Yasaee | B32B 5/00 428/592 |

OTHER PUBLICATIONS

Parlapalli, M. R. et al. "Damage Healing in Thermoplastic Composite Plates by Employing Shape Memory Alloy Wires" Abstract, 2 pgs.

* cited by examiner

THERMALLY ACTIVATED, SHAPE CONFIGURABLE MECHANICAL LOCKING Z-PIN

BACKGROUND

Field

This invention relates generally to a Z-pin for mechanically locking laminate layers in a composite structure and, more particularly, to a Z-pin including two opposing bi-metal structures selectively secured together and inserted into a composite laminate structure, where curing the composite structure causes the Z-pin to bend as a result of the difference in the coefficient of thermal expansion between metal strips in the structures so as to mechanically lock laminate layers in the composite structure.

Discussion

Many structures, such as certain aircraft structures, certain high performance vehicle skins, etc., are composite laminate structures that include a plurality of laminate layers, such as fiber glass layers, fiber reinforced plastic layers, fiber carbon layers, etc. For example, some aircraft skin structures include thirty or so laminate layers each having a thickness of about 0.001-0.015 inches. Typically, these composite layers are formed by laying down an interwoven pattern of fibers, such as carbon fibers, that are immersed in a liquid resin, where the resin is cured by heating, which causes it to harden. The several layers are bonded or secured together by a suitable bonding technique, such as co-curing, adhesive bonding, etc.

The orientation of the fibers in the laminate layers of these types of composite structures typically has high strength in the x and y direction along the length of the fiber, but has a relatively low strength in the z-direction across the fibers. Therefore, it is known in the art to provide mechanical fastening devices that are inserted across the layers to provide increased strength in the z-direction. One well known technique is referred to as Z-pinning that employs Z-pins inserted into and across composite laminate layers in a z-direction to improve resistance to delamination, increase out of plane shear, and increase damage tolerance by providing reinforcement in the z-direction of the structure and not relying simply on adhesive bonding.

A typical Z-pin will be quite small in diameter, such as 0.010-0.020 inches, where a large number of the Z-pins, for example, 60-100, may be inserted cross-wise into the laminate structure per square inch. In one insertion technique, the Z-pins are partially inserted into a top surface of one of the laminate layers while the laminate layers are in a partially cured or pre-preg state, where the resin is still soft and pliable. An ultrasonic tool is positioned against a group of the Z-pins, where the ultrasonic energy creates some level of heating that further softens the resin and allows the Z-pins to be inserted through the laminate layers without interfering with the fibers.

A traditional Z-pin has a cylindrical shape. However, other Z-pins come in variety of shapes and sizes. U.S. Pat. No. 6,514,593 issued to Jones et al., titled Mechanically Locking Z-Pins, assigned to the assignee of this application and herein incorporated by reference, discusses disadvantages of the traditional Z-pin and proposes shaped Z-pins having increased Z-pinning in the z-direction. Shaped Z-pins typically provide superior performance to traditional cylindrical Z-pins because they reduce pullout from the composite matrix by increasing surface area for adhesive bonding, mechanically locking into the matrix, and locking into the fiber reinforcement. However, because of the shape of these types of Z-pins, they are more difficult to insert into the laminate structure using the ultrasonic tool while the laminate structure is in the pre-preg state because the shape of the Z-pin alters the position of the fibers in the composite layers as they are being inserted. Often, this type of damage to the fibers during insertion of the shaped Z-pins affects the structural integrity of the layer.

DETAILED DESCRIPTION OF THE EMBODIMENTS

The following discussion of the embodiments of the invention directed to a Z-pin for securing a composite laminate structure in the z-direction is merely exemplary in nature, and is in no way intended to limit the invention or its applications or uses.

As will be discussed in detail below, the present invention proposes a Z-pin including bi-metal structures secured together in a manner so that elevated temperatures occurring during a thermal composite cure of a composite laminate structure that the Z-pin is inserted into causes the geometry of the Z-pin to change from a traditional Z-pin geometry to a shaped, mechanically locking Z-pin geometry. An array of such Z-pins is inserted into an uncured composite laminate structure in a traditional Z-pinning process. During the high temperature cure of the composite laminate structure, the elevated temperatures necessary for the composite cure causes a deformation in the Z-pin, where the curing of the composite structure locks the Z-pin in the deformed state. This deformed state allows for enhanced mechanical locking of the Z-pin in the composite matrix, thus increasing the performance of the laminate structure.

Figure 1:
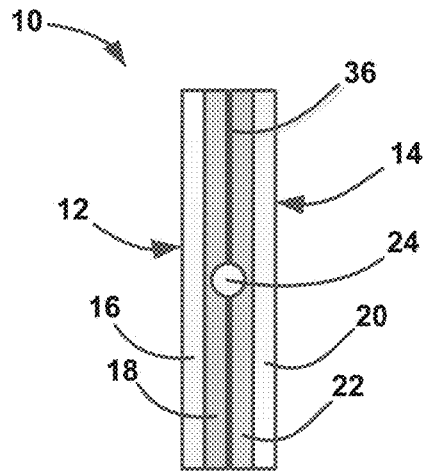
FIG. 1 is a side view of a Z-pin including two opposing bi-metal structures secured together at a central location.

FIG. 1 is a side view of an elongated Z-pin 10 including opposing bi-metal structures 12 and 14. The bi-metal structure 12 includes one metal strip 16 having one coefficient of thermal expansion and another metal strip 18 having a different coefficient of thermal expansion, where the strips 16 and 18 are galvanically compatible. Likewise, the bi-metal structure 14 includes one metal strip 20 being the same metal and having the same coefficient of thermal expansion as the strip 16 and another metal strip 22 being the same metal and having the same coefficient of thermal expansion as the strip 18. The strips 16 and 18 and the strips 20 and 22 are secured together along their common face by any suitable securing technique, such as a thermally compatible adhesive. As is apparent, the strips 18 and 22 being of the same metal are positioned against each other. Further, as will become apparent from the discussion below, in this embodiment, the strips 18 and 22 have a higher coefficient of thermal expansion than the strips 16 and 20 so that the Z-pin 10 bends in the desired manner under heat. The bi-metal structures 12 and 14 are secured together by a selective bond 24 at a generally central location along the length of the structures 12 and 14, as shown.

Figure 2:
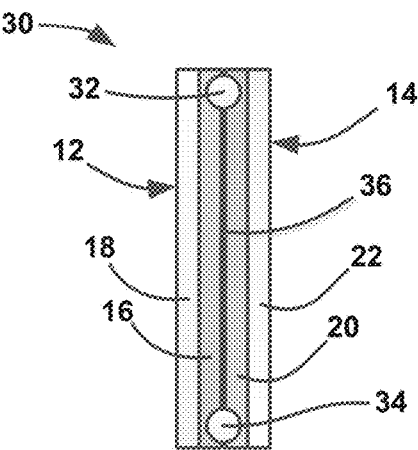
FIG. 2 is a side view of a Z-pin including two opposing bi-metal structures secured together at opposite ends.

FIG. 2 is a side view of an elongated Z-pin 30 similar to the Z-pin 10, where like elements are identified by the same reference number. For the Z-pin 30, instead of securing the structures 12 and 14 at a central location using the bond 24, the structures 12 and 14 are secured together at end locations such as, for example, by bonds 32 and 34. Also, the strips 16 and 20 having the lower coefficient of thermal expansion are positioned against each other instead of the strips 18 and 22 so that the Z-pin 30 bends in the desired manner under heat opposite to that of the Z-pin 10 as will also be discussed below.

The strips 16, 18, 20 and 22 can be any metal suitable for the purposes discussed herein, for example, nickel-copper alloys, manganese-nickel alloys, etc. As mentioned, the structures 12 and 14 are elongated, and are generally shown having a rectangular shape along their length. The length of the structures 12 and 14 can be any length suitable for a particular application so that they can be extended through all of the laminate layers in a composite structure as discussed below. The width or thickness of the structures 12 and 14 can be any suitable dimension for a particular application, such as a square configuration having a diameter dimension of, for example, 0.020 inches. However, other cross-wise configurations of the structures 12 and 14 may be employed other than a square configuration, such as oval, plus-shape, etc. In one embodiment, the bonds 24, 32 and 34 are welds to provide an inexpensive and secure bonding technique, where the opposing strips 18 and 22 or the strips 16 and 20 are compatible to be welded together. In other embodiments, the bond 24 may be formed in other manners, such as by a braze, solder, adhesive, etc.

Although the strips 16 and 20 are the same metal and the strips 18 and 22 are the same metal in this embodiment, in other embodiments, the metal strips in the structures 12 and 14 may be different metals. Further, although the strips 18 and 22 have a higher coefficient of thermal expansion than the strips 16 and 20 in this example, in other embodiments the strips 18 and 22 may have a lower coefficient of thermal expansion than the strips 16 and 20. Also, in other embodiments, it may be desirable that the different coefficient of thermal expansion strips be in contact with each other so that the Z-pins 10 and 30 only bend in one direction.

Figure 3:
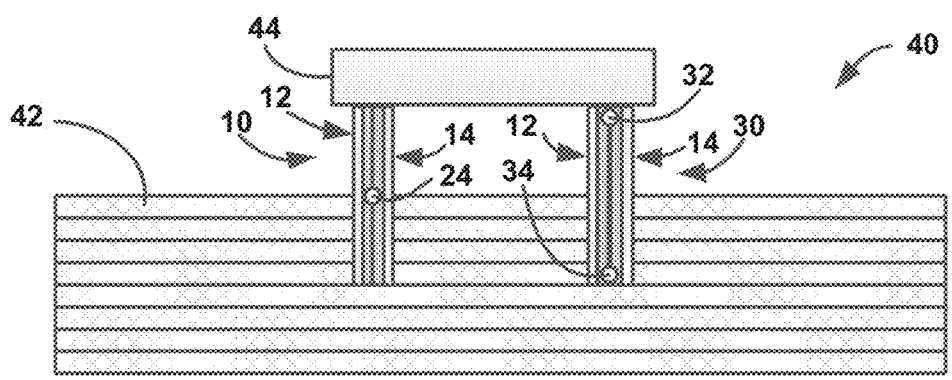
FIG. 3 is a cross-sectional type view of a composite laminate structure into which the Z-pins shown in FIGS. 1 and 2 are partially inserted.

FIG. 3 is a cross-sectional type view of a composite structure 40 including a plurality of composite laminate layers 42. The composite structure 40 is intended to represent any composite structure that may require Z-pins for providing strength in the z-direction, where the thickness of the structure 40, the number of the layers 42, the thickness of the layers 42, the material of the layers 42, etc. would be application specific. Further, the composite structure 40 shown in FIG. 3 is in a partially cured or pre-preg state, where the composite layers 42 are at some level of viscosity and pliability that allows them to be handled as separate layers, but are able to except the Z-pins 10 and 30 using traditional Z-pin insertion techniques.

The Z-pins 10 and 30 are shown partially inserted into the structure 40 in FIG. 3. Box 44 is intended to represent any suitable device for applying pressure to ends of the Z-pins 10 and 30 to force the Z-pins 10 and 30 through the composite layers 42 in the z-direction. For example, the box 44 may represent some type of ultrasonic tool that applies an ultrasonic signal to the Z-pins 10 and 30, which causes the Z-pins 10 and 30 to obtain an elevated temperature suitable enough to cause the resin in the laminate layers 42 to become less viscous around the Z-pins 10 and 30, but not hot enough to cause the Z-pins 10 and 30 to deform.

Figure 4:
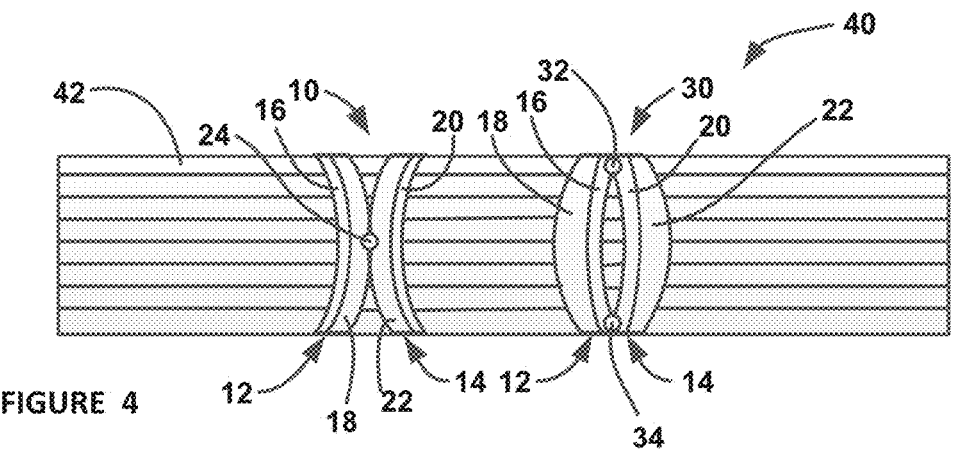
FIG. 4 is a cross-sectional type view of the laminate structure shown in FIG. 3 after it has been cured and showing the Z-pins fully inserted and in a deformed configuration.

Once the Z-pins 10 and 30 are inserted completely into the composite structure 40, the composite structure 40 is then cured and the laminate layers 42 are hardened as shown in FIG. 4. The curing process of the composite structure 40 employs high heat where the resin in the layers 42 first becomes less viscous, and then cures into a hardened configuration as the final product while still under high heat in a manner that is well understood by those skilled in the art. During this curing process, the heat causes the metal strips 16, 18, 20 and 22 to expand according to their coefficient of thermal expansion, and since the bi-metal structures 12 and 14 each having the two dissimilar metal strips secured together having different coefficients of thermal expansion, the structures 12 and 14 will bend accordingly. Since the structures 12 and 14 in the Z-pin 10 are secured at the center location by the bond 24 and the strips 18 and 22 have a higher coefficient of thermal expansion than the strips 16 and 20, the Z-pin 10 will deform in a manner shown in FIG. 4, where ends of the structures 12 and 14 bend away from each other in a symmetrical configuration. Likewise, since the structures 12 and 14 in the Z-pin 30 are secured at the end locations by the bonds 32 and 34 and the strips 18 and 22 have a higher coefficient of thermal expansion than the strips 16 and 20, the Z-pin 30 will bend or bulge at its middle as a result of the structures 12 and 14 being secured together by the bonds 32 and 34.

It is noted that the heat necessary to deform the Z-pin 10 or 30 does not necessarily need to be applied as part of the curing process of the laminate structure 40. Particularly, for a room-temperature composite cure, the heat necessary to cause the Z-pin 10 or 30 to deform and the resin to reduce its viscosity will occur naturally as a result of the exothermic nature of the composite cure process.

While the resin in the layers 42 is in a low viscous state and the structures 12 and 14 are in their deformed configuration during the curing process, the resin will flow into the open areas between the structures 12 and 14 so that when the resin cures and hardens and the heat is removed the structures 12 and 14 are unable to return to their normal shape. In other words, while the structures 12 and 14 are deformed and there is some space between the structure 12 and 14 as a result of the curing heat, the now liquid resin will flow into that space where it eventually hardens. Thus, the Z-pins 10 and 30 are now shaped Z-pins having the structural integrity in the z-direction that is desired. In the specific embodiment shown, the structures 12 and 14 are the same where the strips 16 and 20 or the strips 18 and 22 that have the same coefficient of thermal expansion are positioned opposing each other, which causes the structures 12 and 14 to bend in a symmetrical manner as shown in FIG. 4. If the opposing metal strips having the different coefficients of thermal expansion are positioned against each other, then the structures may bend in the same direction, which may provide benefits for certain applications.

In certain embodiments, it may be desirable that the opposing strips, either the strips 18 and 22 in the Z-pin 10 or the strips 16 and 20 in the Z-pin 30, be bonded together along seam 36 in addition to the bonds 24, 32 or 34 by a suitable adhesive that breaks down at a temperature that is lower than the cure temperature of the composite structure 40. This would allow the Z-pin 10 or 30 to be better held together as a unit for installation into the composite structure 40, where the cure heat would cause the adhesive bond at the seam 36 to break leaving only the bonds 24, 32 and/or 34.

While bi-metal structures appear to offer the most cost effective option for this type of Z-pin, memory metal and memory plastic pins can be configured into more specific geometries with potentially more dramatic geometry changes from the default straight cylinder configuration. Additionally, in lieu of two parallel strips, a long, thinner sheet without a second bonded metal in the center section is rolled up, creating a cylindrical pin. When anchored at the center of the pin, the bi-metal spirals at both ends will expand, growing in diameter, thus creating the shaped Z-pin.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A Z-pin comprising:
    a first bi-metal structure including a first metal strip and a second metal strip bonded together, where the first and second metal strips have different coefficients of thermal expansion; and
    a second bi-metal structure including a third metal strip and a fourth metal strip bonded together, where the third metal strip and the fourth metal strip have different coefficients of thermal expansion, wherein the second metal strip and the third metal strip are selectively secured together at at least one discrete location so that heating of the Z-pin causes the first and second bi-metal strip structures to deform relative to each other, and wherein the first and second bi-metal structures are selectively secured together by at least one weld.

2. The Z-pin according to claim 1 wherein the first and second bi-metal structures are selectively secured together at a central location.

3. The Z-pin according to claim 1 wherein the first and second bi-metal structures are selectively secured together at opposite end locations.

4. The Z-pin according to claim 1 wherein the first and second bi-metal structures are elongated structures having a rectangular cross-section in a length-wise direction and a square cross-section in a cross-wise direction.

5. The Z-pin according to claim 1 wherein the first and fourth metal strips have the same coefficient of thermal expansion and the second and third metal strips have the same coefficient of thermal expansion.

6. The Z-pin according to claim 5 wherein the first and fourth metal strips have a higher coefficient of thermal expansion than the second and third metal strips.

7. The Z-pin according to claim 5 wherein the first and fourth metal strips have a lower coefficient of thermal expansion than the second and third metal strips.

8. The Z-pin according to claim 1 wherein the first and third metal strips have the same coefficient of thermal expansion and the second and fourth metal strips have the same coefficient of thermal expansion.

9. The Z-pin according to claim 1 wherein the deformed first and second bi-metal structures define a shaped Z-pin that is effective to secure laminate composite layers together in a z-direction.

10. A Z-pin for securing laminate layers in a composite structure together in a z-direction, said Z-pin comprising:
    a first bi-metal structure including a first metal strip and a second metal strip bonded together, where the first and second metal strips have different coefficients of thermal expansion; and
    a second bi-metal structure including a third metal strip and a fourth metal strip bonded together, where the third metal strip and the fourth metal strip have different coefficients of thermal expansion, wherein the second metal strip and the third metal strip are selectively welded together at at least one discrete location so that heating of the Z-pin causes the first and second bi-metal structures to deform relative to each other, and wherein the first and second bi-metal structures are elongated structures having a rectangular cross-section in a length-wise direction and a square cross-section in a cross-wise direction, and wherein the deformed first and second bi-metal structures define a shaped Z-pin that is effective to secure the laminate layers together in the z-direction.

11. The Z-pin according to claim 10 wherein the first and second bi-metal structures are selectively secured together at a central location.

12. The Z-pin according to claim 11 wherein the first and fourth metal strips have the same coefficient of thermal expansion and the second and third metal strips have the same coefficient of thermal expansion, and wherein the first and fourth metal strips have a higher coefficient of thermal expansion than the second and third metal strips.

13. The Z-pin according to claim 10 wherein the first and second bi-metal structures are selectively secured together at opposite end locations.

14. The Z-pin according to claim 13 wherein the first and fourth metal strips have the same coefficient of thermal expansion and the second and third metal strips have the same coefficient of thermal expansion, and wherein the first and fourth metal strips have a lower coefficient of thermal expansion than the second and third metal strips.

15. The Z-pin according to claim 10 wherein the first and third metal strips have the same coefficient of thermal expansion and the second and fourth metal strips have the same coefficient of thermal expansion.

16. A method for securing a composite laminate structure, said method comprising:
    providing a Z-pin including a first bi-metal structure having a first metal strip and a second metal strip bonded together, where the first and second metal strips have different coefficients of thermal expansion, and a second bi-metal structure having a third metal strip and a fourth metal strip bonded together, where the third metal strip and the fourth metal strip have different coefficients of thermal expansion, wherein the second metal strip and the third metal strip are selectively secured together at at least one discrete location, and wherein the first and second bi-metal structures are selectively secured together by at least one weld;
    providing a plurality of pre-cured laminate layers that are stacked as a composite laminate structure;
    inserting the Z-pin into the stacked laminate layers in a z-direction; and
    curing the composite laminate structure so as to cure and harden the laminate layers, wherein curing causes the first and second bi-metal structures to deform relative to each other to cause the Z-pin to be a shaped Z-pin where resin material in the laminate layers is hardened between the first and second bi-metal structures so as to maintain the Z-pin its shaped configuration after the composite structure is cured.

17. The method according to claim 16 wherein providing a Z-pin includes securing the first and second bi-metal structures at opposite end locations.

18. The method according to claim 16 wherein providing a Z-pin includes providing the first and second bi-metal structures as elongated structures having a rectangular cross-section in a length-wise direction and a square cross-section in a cross-wise direction.

19. A Z-pin comprising:
a first bi-metal structure including a first metal strip and a second metal strip bonded together, where the first and second metal strips have different coefficients of thermal expansion; and
a second bi-metal structure including a third metal strip and a fourth metal strip bonded together, where the third metal strip and the fourth metal strip have different coefficients of thermal expansion, wherein the second metal strip and the third metal strip are selectively secured together at a discrete central location so that heating of the Z-pin causes the first and second bi-metal strip structures to deform relative to each other.

20. The Z-pin according to claim 19 wherein the deformed first and second bi-metal structures define a shaped Z-pin that is effective to secure laminate composite layers together in a z-direction.

21. A Z-pin comprising:
a first bi-metal structure including a first metal strip and a second metal strip bonded together, where the first and second metal strips have different coefficients of thermal expansion; and
a second bi-metal structure including a third metal strip and a fourth metal strip bonded together, where the third metal strip and the fourth metal strip have different coefficients of thermal expansion, wherein the second metal strip and the third metal strip are selectively secured together at discrete opposite end locations so that heating of the Z-pin causes the first and second bi-metal strip structures to deform relative to each other.

22. The Z-pin according to claim 21 wherein the deformed first and second bi-metal structures define a shaped Z-pin that is effective to secure laminate composite layers together in a z-direction.

* * * * *